(12) United States Patent
Green

(10) Patent No.: US 6,467,691 B1
(45) Date of Patent: Oct. 22, 2002

(54) RECORD CARRIER AND METHOD OF LABELLING AN ARTICLE OF VALUE

(75) Inventor: Ian Macdonald Green, London (GB)

(73) Assignee: Thorn Secure Science Limited, Wiltshire (GB)

( * ) Notice: Subject to any disclaimer, the term of this patent is extended or adjusted under 35 U.S.C. 154(b) by 0 days.

(21) Appl. No.: 09/308,577

(22) PCT Filed: Nov. 14, 1997

(86) PCT No.: PCT/GB97/03139

§ 371 (c)(1),
(2), (4) Date: Sep. 22, 1999

(87) PCT Pub. No.: WO98/24055

PCT Pub. Date: Jun. 4, 1998

(30) Foreign Application Priority Data

Nov. 23, 1996 (GB) .............................................. 9624396

(51) Int. Cl.[7] .............................................. G06K 19/00
(52) U.S. Cl. ....................................... 235/487; 235/493
(58) Field of Search ................................ 235/380, 487, 235/435, 494

(56) References Cited

U.S. PATENT DOCUMENTS

| | | | | | |
|---|---|---|---|---|---|
| 3,833,795 | A | * | 9/1974 | Shoshani et al. | 101/72 |
| 4,191,376 | A | * | 3/1980 | Goldman et al. | 273/139 |
| 4,469,937 | A | * | 9/1984 | Stockburger et al. | 235/435 |
| 4,645,916 | A | * | 2/1987 | Raisleger | 235/494 |
| 4,686,527 | A | * | 8/1987 | Goldman | 340/825.34 |
| 4,705,938 | A | * | 11/1987 | Stockburger et al. | 235/435 |
| 4,707,593 | A | * | 11/1987 | Murata et al. | 235/487 |
| 4,745,267 | A | * | 5/1988 | Davis et al. | 235/379 |
| 4,992,646 | A | * | 2/1991 | Collin | 235/375 |
| 4,998,009 | A | * | 3/1991 | Iijima et al. | 235/487 |
| 5,151,582 | A | * | 9/1992 | Fujioka | 235/440 |
| 5,499,816 | A | * | 3/1996 | Levy | 273/139 |
| 5,545,883 | A | | 8/1996 | Sasou et al. | 235/449 |
| 5,583,333 | A | * | 12/1996 | Hoshino et al. | 235/493 |
| 5,703,755 | A | * | 12/1997 | Flesher | 361/737 |
| 5,714,743 | A | * | 2/1998 | Chiba et al. | 235/449 |
| 5,880,769 | A | * | 3/1999 | Nemirofsky et al. | 348/12 |
| 6,029,887 | A | * | 2/2000 | Furuhashi et al. | 235/379 |
| 6,179,211 | B1 | * | 1/2001 | Green et al. | 235/493 |

FOREIGN PATENT DOCUMENTS

| | | | |
|---|---|---|---|
| EP | 0 625 766 | | 11/1994 |
| FR | 2 069 355 | | 9/1971 |
| FR | 2 441 218 | | 6/1980 |
| GB | 2 021 835 | | 12/1979 |
| JP | 08-022519 | * | 1/1996 |
| JP | 8-263620 | | 10/1996 |
| JP | 10-247229 | * | 9/1998 |
| WO | 92/16913 | * | 10/1992 |

* cited by examiner

Primary Examiner—Michael G. Lee
Assistant Examiner—Diane I. Lee
(74) Attorney, Agent, or Firm—Crowell & Moring LLP

(57) ABSTRACT

A record carrier has a secure first data storage device storing a plurality of different identification numbers in a sequence and a further data storage device storing a further number. The identification numbers are successive integers, and the further number is the least significant digit of one of the successive integers. The secure data storage device preferably includes permanently structured magnetic tape. The further number is derivable in a predetermined way from only one of the identification numbers, thus identifying uniquely which one of the identification numbers is characteristic of the record carrier.

9 Claims, 1 Drawing Sheet

RECORD CARRIER AND METHOD OF LABELLING AN ARTICLE OF VALUE

BACKGROUND AND SUMMARY OF THE INVENTION

This invention relates to a record carrier, and particularly, though not exclusively, to a credit card or the like having a secure data storage means. It also relates to a method of labelling an article of value.

A known data carrier is described in GB-A-1,331,604, in which a credit card is provided with a secure data storage means comprising a layer having spaced regions in which anisotropic magnetic particles are dispersed and fixedly aligned in a binder along a pre-set direction. In remaining regions of the layer the particles are not so aligned or are aligned along a substantially different pre-set direction. This arrangement is commonly described as a magnetic "watermark" or as forming a "permanent magnetic structure" since unlike conventional magnetic recordings the pattern of remanent magnetisation revealed by uniaxially magnetising or "developing" the document can be restored by re-magnetisation even after erasure (by, for example, the application of an a/c erase field). A magnetic "watermark" is particularly well suited to recording data in digital form since each alignment direction may be assigned a different significance i.e. a binary "ONE" or a binary "ZERO". Such a data storage means is fairly secure because the patterns comprising the data cannot be erased because the structure is permanently aligned in a given direction.

Due to the "built-in" nature of the recording, a data storage means may conveniently be prepared as a single "watermarked" tape comprising a sequence of binary coded numbers which provide a security feature when cut from the tape and applied to a support such as a document or card. Each of these identification numbers is different and is separated from the others by a marker or "sentinel" comprising a unique sequence of binary digits which itself never appears in the sequence. For this reason the "sentinel" can always be identified so that by reference to its position on the record carrier the digits chosen by the issuer of the record carrier as an identification number to be characteristic of the record carrier or to represent the security data (a particular set of characters appearing on the document, for example) can always be recovered.

However, due to tolerancing problems during manufacture of the tape and problems of registration between the tape and the support it is not possible without recourse to the use of expensive equipment, to ensure that a "sentinel" or "sentinels" always appear in the same position on the document.

In practice, when one "sentinel" appears at each end of the document the digits between the "sentinels" are chosen to represent the security data. It sometimes occurs, however, that only one "sentinel" appears on the document so that depending upon the exact location an appropriate number of digits, selected from both sides of the "sentinel", are chosen to represent the security data identifying that document. Thus for each position of the first detected "sentinel" there is a different binary digit selection rule for choosing the bits constituting the security data. The sequence of bits representing the security data may then be used as verification information, or may be used to derive verification information, which for example, the user may have to supply before the card is validated. Such verification information is preferably unique and characteristic of the given record carrier.

This technique, however, has a weakness for the case when the first "sentinel" on the card is close to an edge. In such a case it is possible for the card reader to fail to detect the first "sentinel" and instead pick up the second "sentinel" on the card. Thus there is always the possibility of an ambiguity. For instance suppose that a card is made in a factory, and a piece of magnetic tape is attached to the card, the tape having the number 300 together with parts of the numbers 299 and 301. The card is read in the factory and the identification number 300 is obtained. Without knowing how the "sentinels" lie with respect to the edge of the card, it is possible for card readers in the field to recognise the identification number of the card as 299, 300 or 301. This is clearly undesirable for cards for use in financial transactions, as it might be possible to confuse two cards having adjoining lengths of "watermarked" tape attached to them. It is also undesirable for cards used for claiming benefit, or access control, or identification, or having a stored value such as prepaid fare cards.

In order to solve this problem, "WATERMARK" tape made by THORN Secure Science Limited, Swindon, England, is often applied to cards in a registered fashion such that the "sentinels" always occur at the same point on a card. Increased production costs are associated with such registered cards.

Another method of making security documents is disclosed in GB-A-2 021 835. In this method the position of the sentinel is erasably recorded on a different portion of the document, thus eliminating ambiguity.

According to a first aspect of the invention, there is provided a record carrier. This can provide the advantage of identifying the record carrier uniquely without having to resort to expensive registration schemes to ensure that the markers are always at exactly the same position on the record carrier.

The invention is particularly advantageous for credit cards and the like provided with permanently structured magnetic ("watermark") tape, as it allows the tape to be placed freely on the carrier without the risk of introducing ambiguity.

According to a second aspect of the invention there is provided a method of labelling an article of value.

BRIEF DESCRIPTION OF THE DRAWINGS

Embodiments of the present invention will now be described, by way of example only, with reference to the accompanying diagrammatic drawings, in which.

DETAILED DESCRIPTION OF THE DRAWINGS

Figure 1:
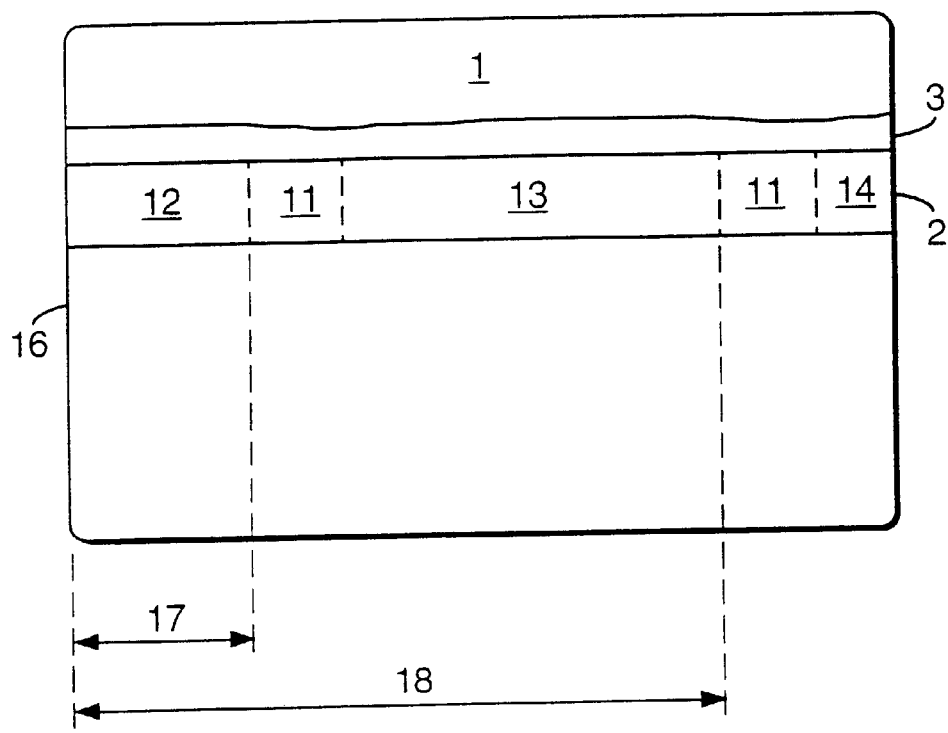
FIG. 1 shows a record carrier according to a first aspect of the invention.

In FIG. 1, a record carrier (1) is shown in the form of an article of value such as a credit card. The record carrier is provided with a tamper resistant first data storage means (2) which stores a plurality (12, 13, 14) of different identification numbers in a sequence, and a further data storage means (3) which stores a further number. The further number is derivable in a predetermined way from only one (13) of the said plurality. The further number thus identifies which one of the said plurality of possible identification numbers has been chosen to be characteristic of the record carrier (1). In the present example, the tamper resistant first data storage means (2) is constituted by a layer comprising a length of "WATERMARK" tape obtainable from Thorn Secure Science Limited, Swindon, England. This tape is described in greater detail in GB 1,331,604, and comprises spaced regions in which anisotropic magnetic particles (preferably acicular gamma iron III oxide particles) are dispersed and fixedly aligned in a binder along a pre-set direction. The data encoded thereon comprises markers known as start sentinels (11), having identification numbers (12, 13, 14) in the form of digits (for example binary digits) therebetween. The identification numbers are in a sequence comprising the integers arranged in ascending magnitude.

The data on the record carrier can be read in at least two different ways. Firstly, using the conventional method, the identification numbers (which are stored in the watermark tape) are read by a read head. The numbers are usually 12 digit numbers and are to be read securely. The reader then reads the number stored in the further storage means (3) which need not be read or stored securely. For example, the reader may read the numbers 999 000 123 455 and 999 000 123 456 securely. The number stored in further storage means 3 has to be uniquely derivable from only one of these numbers. One way of deriving such a unique number from successive integers is to discard all digits except the least significant digit. Therefore if the number 6 is read in storage means 3, the reader is programmed to disregard the number 999 000 123 455 and identify the number 999 000 123 456 as being the unique identification number which will be associated with the given card in the card issuer's database. For this method to work as described, the base of the number system in which the integer is expressed (e.g. 2 for binary or 10 for decimal) must be equal to or greater than the number of identification numbers in the plurality on a given record carrier which are readable.

A second way of reading the data on the record carrier is described in our copending patent application GB 9601463.4. Using this method, each identification number is deemed to start at the beginning of the marker or start sentinel to the left of the identification number in FIG. 1. The beginning of the start sentinel before the identification number N is therefore at analogue position N.000 (e.g. 0.000 if N=0). As well as reading the number which follows the marker, the read head is arranged to measure the distance (x, 17) between the edge of the card 16 and the beginning of the first marker. This analogue distance is then expressed as a fraction of the marker pitch by dividing x by the distance between the markers (i.e. 18-17). Thus a fractional identification number is derived from one of a sequence of integer identification numbers. Measuring the distance (x) and evaluating the fraction is normally straightforward. The data on cards is generally set down at a constant pitch and is designed to be self clocking. For example, "WATERMARK" data is commonly encoded at a constant pitch of 33 bits per inch, and might in one embodiment have 70 bits between the beginning of successive start sentinels. By counting the number of bits received before the first recognised start sentinel and dividing by 70 one obtains the distance between the edge of the card and the first start sentinel expressed as a fraction between 0 and 1. As an example, if 22 bits are received before the first start sentinel, one obtains 22/70=0.31. The corresponding identification number if the following number is N is therefore the number N minus 0.31.

Although the end of the number denoted by 14 in FIG. 1 is missing from the record carrier, it may be reconstructed by a suitable algorithm working from the available part of 14 and the latter part of 13 which precedes the start sentinel.

Examples will now be described of methods by which a record carrier according to the present invention may be employed in a security system using the identification method described above (as the second method of reading data) and in our co-pending patent application GB 9601463.4.

In a first example of such a method, the party issuing the record carrier starts by affixing a length of watermark tape to a substrate such as a card to form the record carrier. The issuer then passes the record carrier to a reader which reads the fractional identification number made up from the integer stored by the watermark layer and the position of the sentinel as described above. The number obtained may be 999 000 123 45.88 say. (Note that with a conventional reader using the first method of reading the data described above the integer number 999 000 123 45 or 999 000 123 46 would be obtained). Next, the number obtained is converted into a 12 digit identification number by rounding the number to the first decimal place. This gives the 12 digit number 999 000 123 459. This number is the number stored by the issuing party in the central database and is a unique number characteristic of that specific record carrier which can be used to identify and/or authenticate the record carrier. The last digit represents the position of the start sentinel on the card thereby giving a further degree of protection against fraud. Next, the last digit of the 12 digit number—in the present case 9—is recorded by the issuing party at another location on the record carrier (for example in a magnetic tape track running parallel to the watermark tape track 2) where it can be read by a reader in the field. This digit need not be recorded in a secure storage means, normal magnetic tape or other storage means such as embossing or optical or electronic storage means may be used.

When the above record carrier is presented for authorisation/identification in the field, the record carrier is presented to a reader which reads its characteristic identification number. In general there will be a small measurement error when the number is read, so that the number obtained in the field might be 999 000 123 45.81 say. The reading apparatus rounds this to the closest 12 digit number to give 999 000 123 458. The reader also reads the digit 9 from the other storage means on the record carrier and compares this with the last digit 8 which was read from the identification number. If the numbers are sufficiently close, say within +/−2, the reading apparatus substitutes this number 9 as the last digit of the 12 digit identification number. If the numbers are not sufficiently close the reader signals an error. Thus if the number read in the field is between 999 000 123 457 and 999 000 123 461 it will report the number to the central database as 999 000 123 459.

In a second example of such a method, the party issuing the record carrier starts by affixing a length of watermark tape to a substrate such as a card to form the record carrier. The issuer then passes the record carrier to a reader which reads the fractional identification number made up from the integer stored by the watermark layer and the position of the sentinel as described above. The number obtained may be 999 000 123 45.88 as before. Next, the number obtained is converted into an 11 digit identification number by rounding the number to the closest integer. This gives the 11 digit number 999 000 123 46. This number is the number stored by the issuing party in the central database and is a unique number characteristic of that specific record carrier and which can be used to identify and/or authenticate the record carrier. The record carrier issuer then records at another location on the carrier whether this integer is even or odd. This requires only one bit of storage, and once again need not be securely stored. When this record carrier is presented for authorisation/identification in the field, the record carrier is presented to a reader which reads its characteristic identification number. In general there will be a small measurement error, so that the number obtained in the field might be 999 000 123 45.81 say. The reading apparatus rounds this to the closest 11 digit number to give a provisional identification number 999 000 123 46. The reader also recovers the bit, from track 2, that says whether the identification number is odd or even. If this agrees with the provisional identification number, then the reader returns this number. If there is no agreement, and if the fractional component of the identification numbers was sufficiently close to 0.5, say within +/−0.2, the reading apparatus increments (if the fraction were below 0.5) or decrements (if above 0.5) the provisional identification number. Otherwise, the reader signals an error. In the present example, the reader would return an identification number of 999 000 123 46, and would signal an error if the stored parity bit indicated that the identification number should be odd.

Figure 2:
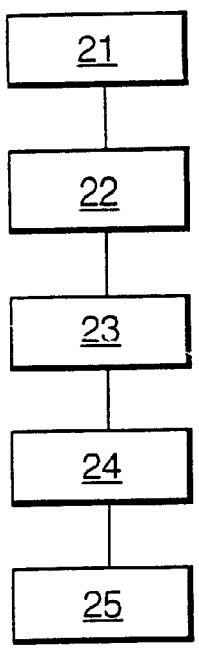
FIG. 2 shows a flow diagram of a method according to a second aspect of the invention.

A method of labelling an article of value according to the second aspect of the invention is shown in the flow diagram of FIG. 2. In this Figure, the blocks have the following significance. Block 21 denotes the step of affixing a secure data storage means (2) carrying a plurality of different identification numbers or parts thereof to the article. Block 22 denotes the step of choosing one of the plurality of identification numbers (12, 13, 14) or parts thereof in accordance with a predetermined scheme. Block 23 denotes the step of deriving a further number characteristic of only the chosen one of said plurality. Block 24 denotes the step of storing the further number in a further data storage means (3) carried by the article. Finally, block 25 denotes the step of storing the corresponding chosen identification number in a data storage means separate from said article Although methods of using the record carrier are described above, there are other practical alternatives which fall within the scope of the present invention. For example, the concepts of rounding to 11 digits might be combined with a check on the fractional part of the identification number.

The invention is most relevant to on-line systems, where a central computer checks the validity of the identification number returned by the reader. However, it is also applicable to off-line systems where the identification number may be stored as part of a transaction certificate.

It will be appreciated that there is no advantage to be gained by fraudulently altering the separately stored digit. In the first method described above the result would be either to make the reader signal an error or to return an invalid identification number. In the second reading method, the same result holds but for different reasons. For cards having fractional numbers close to 0.4 or 0.5 it would be possible to change the stored bit from odd to even (or vice versa) without the reader detecting an error. The reader would then return the wrong identification number. However, the wrong identification number is never that of a valid card, since the adjacent issued card under these circumstances always has an ID which is spaced by 2 rather than 1.

The invention is expected to find application in systems using unregistered Watermark tape, where there is a desire to associate a unique integer identification number with each record carrier without special measures to position the tape on the substrate.

What is claimed is:

1. A record carrier having a secure data storage device storing a plurality of different identification numbers or parts thereof in a sequence, and a further data storage device storing a further number, the further number being derivable in a predetermined way from the value of only one of said plurality of different identification numbers or parts thereof, the further number indicating which one of said plurality of different identification numbers or parts thereof is characteristic of the record carrier, wherein the plurality of different identification numbers comprise successive integers and the further number comprises the least significant digit of one of said integers.

2. A record carrier as claimed in claim 1 in which the secure data storage device comprises a layer of material having a permanent pattern of a detectable magnetic property.

3. A record carrier as claimed in claim 2 in which the layer of material comprises spaced regions including permanently aligned anisotropic magnetic particles.

4. A record carrier as claimed in claim 1 in which the further data storage device comprises a layer of material storing data as a pattern of a detectable magnetic property.

5. A record carrier as claimed in claim 1 in which the data in the further data storage device is not secure.

6. A credit or debit card constituting a record carrier as claimed in claim 1.

7. A smart card constituting a record carrier as claimed in claim 1.

8. A smart card as claimed in claim 7 in which the plurality of different identification numbers or parts thereof are stored in a secure memory location.

9. A method of labeling an article of value, including the acts of a) affixing a secure data storage device carrying a plurality of different identification numbers or parts thereof to the article, b) choosing one of the plurality of identification numbers or parts thereof in accordance with a predetermined scheme, c) deriving a further number characteristic of only the chosen one of said plurality of different identification numbers or parts thereof, d) storing the further number in a further data storage device carried by the article, e) storing the corresponding chosen identification number in a data storage device separate from said article, wherein the plurality of different identification numbers comprise successive integers and the further number comprises the least significant digit of one of said integers.

* * * * *